United States Patent
Lecaros Easton et al.

(10) Patent No.: US 11,372,926 B2
(45) Date of Patent: Jun. 28, 2022

(54) ASYNCHRONOUS CONTEXT COMMUNICATION FOR SPEECH SERVICES

(71) Applicant: MICROSOFT TECHNOLOGY LICENSING, LLC, Redmond, WA (US)

(72) Inventors: Gerardo Andres Lecaros Easton, Seattle, WA (US); Minko Stefanov Minkov, Kirkland, WA (US); Matthew Vernon Johnson, Carnation, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 525 days.

(21) Appl. No.: 16/518,819

(22) Filed: Jul. 22, 2019

(65) Prior Publication Data
US 2021/0026896 A1    Jan. 28, 2021

(51) Int. Cl.
| | | |
|---|---|---|
| G10L 15/00 | (2013.01) | |
| G06F 16/9032 | (2019.01) | |
| G06F 9/448 | (2018.01) | |
| B60K 35/00 | (2006.01) | |
| G10L 15/22 | (2006.01) | |
| G10L 15/30 | (2013.01) | |
| H04L 9/32 | (2006.01) | |
| H04L 51/02 | (2022.01) | |
| H04L 9/40 | (2022.01) | |
| H04L 51/046 | (2022.01) | |
| G10L 15/24 | (2013.01) | |
| G10L 15/32 | (2013.01) | |

(52) U.S. Cl.
CPC ........ *G06F 16/90332* (2019.01); *B60K 35/00* (2013.01); *G06F 9/4498* (2018.02); *G10L 15/22* (2013.01); *G10L 15/24* (2013.01); *G10L 15/30* (2013.01); *G10L 15/32* (2013.01); *H04L 9/3213* (2013.01); *H04L 51/02* (2013.01); *H04L 51/046* (2013.01); *H04L 63/04* (2013.01)

(58) Field of Classification Search
CPC combination set(s) only.
See application file for complete search history.

(56) References Cited

U.S. PATENT DOCUMENTS

| | | | |
|---|---|---|---|
| 2015/0040012 A1 | 2/2015 | Ng et al. | |
| 2018/0137856 A1 | 5/2018 | Gilbert | |
| 2018/0336275 A1 | 11/2018 | Graham et al. | |
| 2019/0147173 A1 | 5/2019 | Mai | |

OTHER PUBLICATIONS

"International Search Report and Written Opinion Issued in PCT Application No. PCT/US2020/036814", dated Sep. 15, 2020, 32 Pages.

*Primary Examiner* — Vu B Hang
(74) *Attorney, Agent, or Firm* — Workman Nydegger

(57) ABSTRACT

A remote personal assistant server/service is configured with a plurality of different state machines for supporting asynchronous communications with the front-end interfaces of personal assistants and for supporting the interfacing with a plurality of proprietary back-end intelligence bots, which are independently controlled and separate from the remote personal assistant service/server.

20 Claims, 7 Drawing Sheets

Architecture 200A

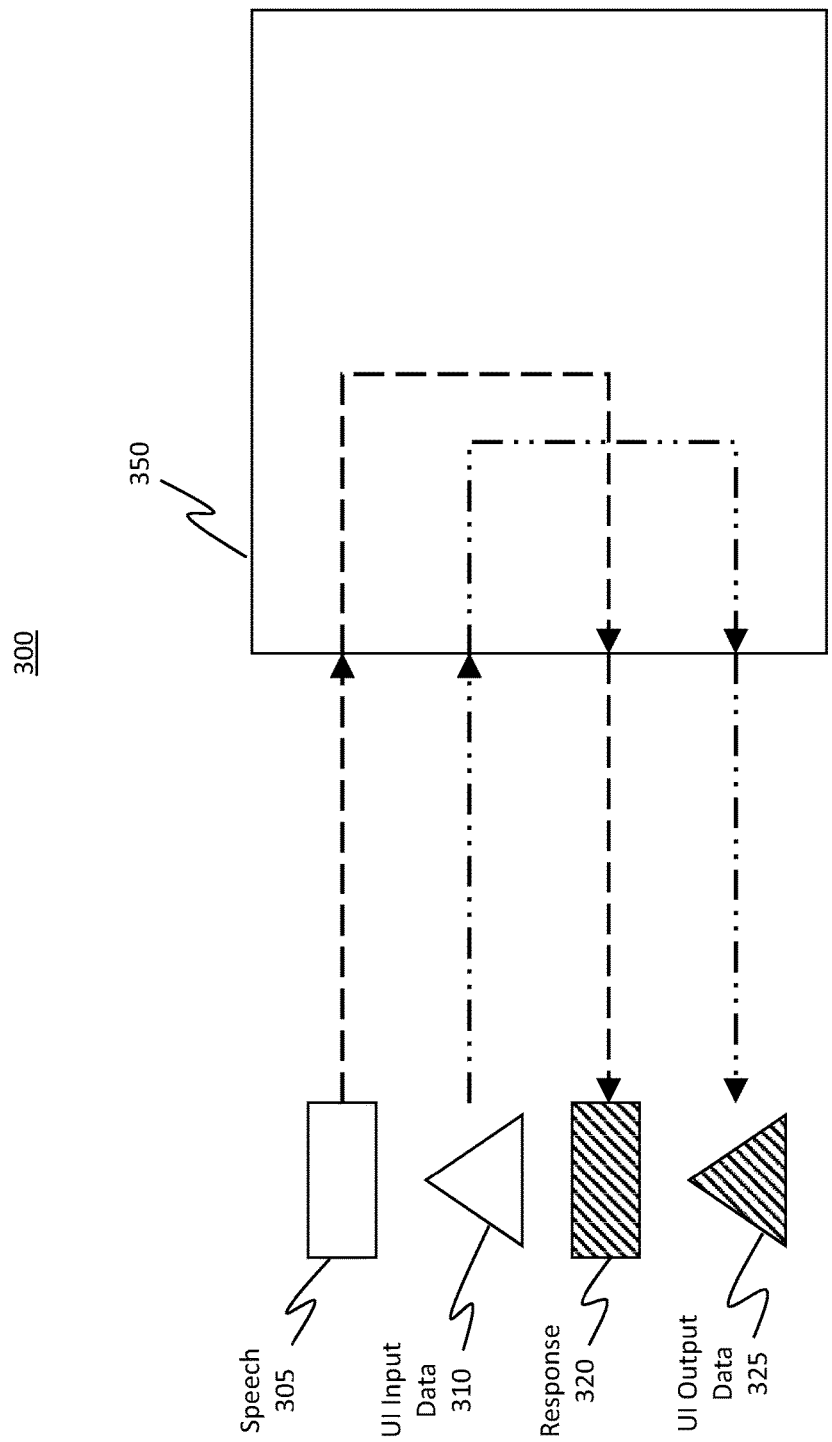

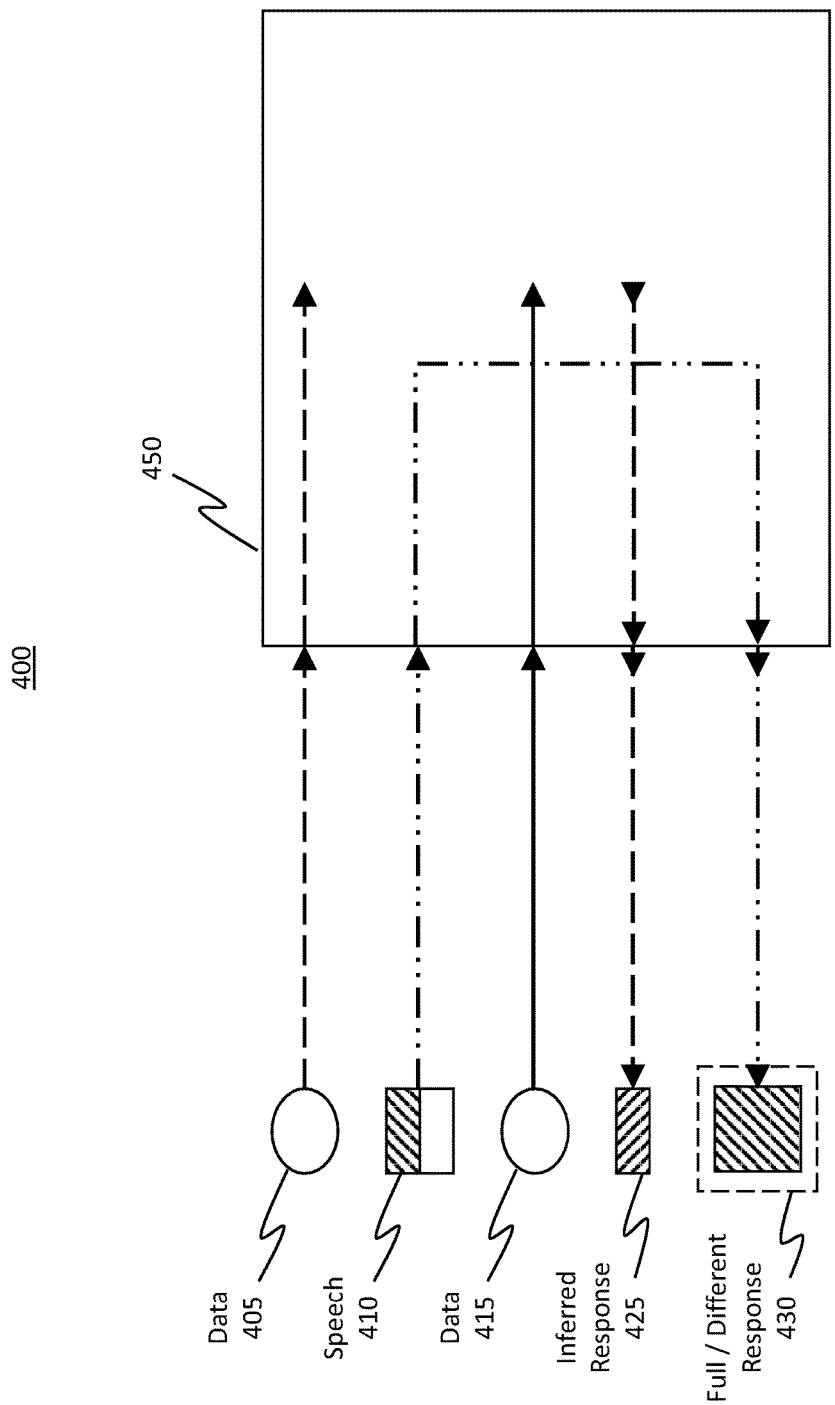

ASYNCHRONOUS CONTEXT COMMUNICATION FOR SPEECH SERVICES

BACKGROUND

Background and Relevant Art

Computers and computing systems have affected nearly every aspect of modern living. Computers are generally involved in work, recreation, healthcare, transportation, entertainment, household management, etc.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, speech to text interfaces, gesture interfaces, sensor interfaces and the like.

A relatively new and powerful development in computer technology is the configuration of a personal digital assistant, also referred to herein as simply a personal assistant. Examples of personal assistants include Microsoft's Cortana™, Apple's Siri™ Amazon's Alexa™, Samsung's Bixby™ and Google's Google Assistant.

Personal assistants comprise powerful computing system infrastructures and interfaces that include speech to text interfaces for enabling a user to speak to the personal assistant to perform a query and/or to initiate another function with the personal assistant. The personal assistant is configured with a front-end interface, such as the speech to text interface, for receiving user input and for providing output from the personal assistant, as well as back-end intelligence for performing the queries and functions requested by the user. Typically, the personal assistant stores/maintains personal information about the user and user devices to customize and render the desired functions and output, on demand, and in a personalized manner.

While personal assistants can be very personal and useful, they are somewhat limited in their applicability to new and diverse computing environments, such as the automobile industry and other enterprise environments that may invoke proprietary interfaces and applications. For instance, if a developer wants to create new applications or interfaces for facilitating personal assistant functionality within a new computing environment (e.g., an automobile), the developer is typically constrained to create the new applications/interfaces as plug-ins or shim layer applications that interface with the one or more pre-existing personal assistant(s). They are not permitted, for example, to control the back-end intelligence modules that are integrated into the existing personal assistant.

Alternatively, the developer must create an entirely new and proprietary stand-alone personal assistant, with built-in speech/interface services and back-end intelligence, which can be prohibitively expensive.

Currently, there is no mechanism for enabling developers to create customized and proprietary personal assistants, which include proprietary back-end intelligence/functionality, particularly in a manner that enables the personal assistants to still leverage common speech services utilized by other personal assistant and which further enable the leveraging of and interfacing with other personal assistants.

Another problem with existing personal assistants is that they require synchronous processing of commands for the devices/applications that they interface with through the personal assistant, including the utilizations of developer plug-in/shim layer applications. This is a result, at least in part, due to conventional personal assistants utilizing only a single state machine for processing the user input and data passed between the front end of the personal assistant (such as the speech to text interface) and the assistant's back-end intelligence.

For instance, if a user is talking to a personal assistant to perform a query, the processing of the speech by the personal assistant must be completed prior to the audible response data being spoken back to the user by the personal assistant. It is also not possible for the user to initiate or receive other processing through the personal assistant, until each prior process that was initiated with the personal assistant is completed, synchronously, one at a time. In this regard, users are not able to benefit from multi-task functionality with existing configurations of personal assistants.

Yet another problem with existing personal assistants is that they are provided significant exposure to a user's personal information, as well as significant control over the way in which the back-end intelligence decides to use and share this personal information. This exposure and control to a user's personal information can help the personal assistant provide personalized and targeted advertisements and suggestions that may be appreciated and helpful to a user. However, this substantial exposure and control to a user's personal information can also, sometimes, create privacy concerns for a user. Such a concern, for instance, is the potential for the user's personal information to be shared by the personal assistant with other services and applications linked to by the personal assistant, without the user's knowledge and possibly against the user's wishes.

The configuration of existing personal assistants to provide broad functionality to support a very broad range of the different applications and utilities, can also cause the back-end intelligence of the personal assistant to be somewhat unwieldy and to incur undesired delays, particularly when compared to more specialized services/systems that do not support such a broad range of applications.

While the subject matter claimed herein is not limited to embodiments that solve any disadvantages or that operate only in environments such as those described above, it will be appreciated that there is an ongoing need to provide systems and methods for improving the way in which personal assistants are configured and utilized.

BRIEF SUMMARY

Disclosed embodiments include systems, methods and devices configured to facilitate and support customized personal assistant services and, in some instances, to provide and/or support asynchronous speech services that can be used with personal assistants.

One embodiment illustrated herein includes a remote personal assistant service or server that has a plurality of different state machines for supporting asynchronous communications with the front-end interfaces of personal assistants and for supporting the interfacing with a plurality of proprietary back-end intelligence bots, which are independently controlled and separate from the remote personal assistant service/server.

In some instances, the remote personal assistant server facilitates and supports customized personal assistant services, including at least asynchronous speech services for one or more remotely connected personal assistants.

In some instances, the personal assistant server comprises a plurality of state machines, including a first input state machine which manages state and processing flow of a first type of input which is received from a speech interface for one or more remotely connected personal assistants, including at least a first personal assistant, as well as a second input state machine which manages state and processing flow of a second type of input which is received from one or more interfaces other than the speech interface of the one or more remotely connected personal assistants. The plurality of state machines also includes at least one output state machine which manages state and processing flow of output provided to the one or more remotely connected personal assistants in response to at least the first and second type of input.

The remote personal assistant also includes one or more processors and one or more computer-readable media having stored instructions that are executable by the one or more processors to cause the personal assistant server to implement one or more methods for supporting asynchronous speech services, as disclosed herein.

Disclosed methods implemented by the remote personal assistant include a plurality of acts performed by the remote personal assistant. These acts include the act of instantiating, exposing or otherwise providing a plurality of different state machines, such as the first and second input state machines and the at least one output state machine referenced above. The acts also include the remote personal assistant receiving first input from a first personal assistant, which includes the first type of input (e.g., speech input), wherein the first input state machine controls the state and processing flow of the first input at the personal assistant server.

Then, the first input is transformed, such as by being converted into a different form and/or augmented with different information, such as contextual information based on other input data received by the remote personal assistant.

Then, once output corresponding to the first input is received, it is sent to the first personal assistant asynchronously from the processing flow of the first input controlled by the first state machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates a processing flow diagram that reflects the flows of two different processes that are performed asynchronously, by implementing aspects of the systems/methods disclosed herein.

FIG. 4 illustrates a processing flow diagram that reflects a plurality of different processes that are performed asynchronously, by implementing aspects of the systems/methods disclosed herein.

DETAILED DESCRIPTION

Figure 1:
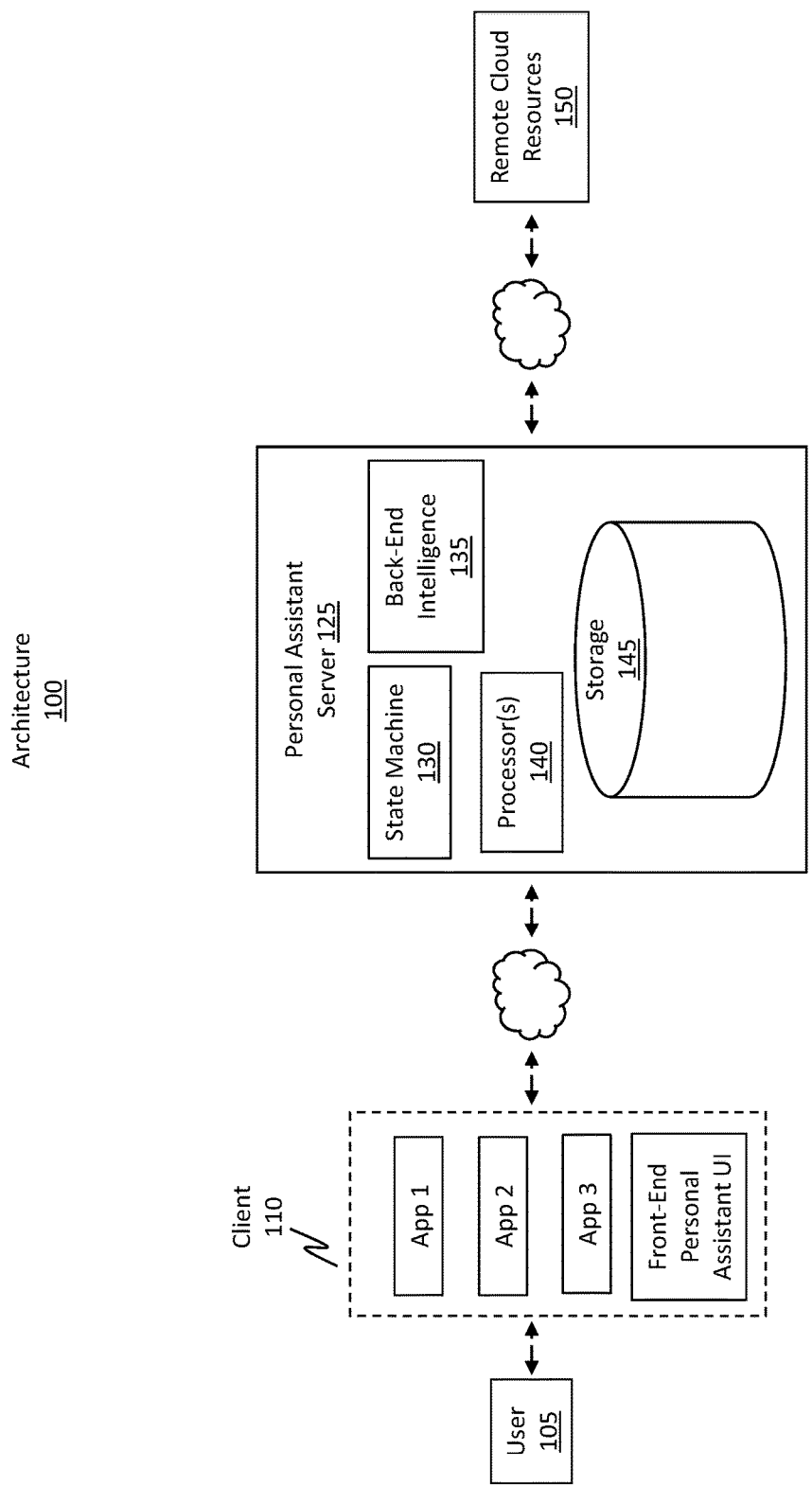
FIG. 1 illustrates an embodiment of a conventional personal assistant system architecture in which a personal assistant is configured with a single state machine and back-end intelligence.

As previously noted, the disclosed embodiments generally include systems, methods and devices configured to facilitate and support customized personal assistant services and, in some instances, to provide and/or support asynchronous speech services that can be used with personal assistants.

In some embodiments, a remote personal assistant service or server is configured with a plurality of different state machines for supporting asynchronous communications with the front-end interfaces of personal assistants and for supporting the interfacing with a plurality of proprietary back-end intelligence bots, which are independently controlled and separate from the remote personal assistant service/server.

The disclosed configurations for the remote personal assistant server can help facilitate the manner in which an enterprise or other entity can deploy and use a customized/proprietary personal assistant with one or more front-end interface(s) for interfacing with a user, and which leverages some common tools (such as speech services) by an intermediary personal assistant server having a plurality of state machines to support asynchronous communications with the personal assistant, and which also utilizes functionality of customized and proprietary personal assistant back-end intelligence bots that are separate from the personal assistant server, and which can be customized by the developer of the personal assistant to provide output that is desired/rendered with the personal assistant's front-end interface(s).

As will be described in more detail herein, this configuration of splitting a personal assistant front-end from the back-end intelligence, with an intermediary personal assistant server having a plurality of different state machines for facilitating asynchronous communications with the personal assistant(s), can provide many technical benefits and practical applications, including addressing many of the problems identified in the background section of this application.

These benefits and applications may include, for instance, facilitating the way a personal assistant can be used to perform multiple asynchronous tasks with a user, including asynchronous speech services, and for supporting multiple different personal assistants that share functionality of a common intermediary personal assistant server. The benefits that can be realized also include, in some instances, a reduction in delays that could otherwise be experienced by conventional personal assistants that are more monolithic and centrally controlled. The benefits of the disclosed embodiments can also include a decreased risk of exposing and losing control to confidential personal information, as compared to risks associated with providing personal information to a conventional personal assistant.

Attention will now be directed to the figures to illustrate the functionality and features of the disclosed personal assistant embodiments and some distinctions and benefits over conventional personal assistant systems.

FIG. 1, for instance, illustrates a computing architecture 100 of a conventional personal assistant system. As shown, the personal assistant server 125 is configured with a single state machine 130 and back-end intelligence 135 for processing client requests that are generated by a user 105 at a device of a client 110. As also shown, the client 110 includes a plurality of applications (e.g., App 1, App 2, App 3) and a front-end personal assistant UI for enabling the client to interface with the personal assistant server 125 processes the logic for satisfying the client requests at the back-end intelligence 135, which may also access stored data (such as a user's personal information and other information stored in storage 145) and remote cloud resources 150 to obtain additional information needed to satisfy the requests.

As previously noted, the centralized control over a user's personal information at the personal assistant server may be undesirable in some instances, particularly if there are concerns about how that information will be used and accessed by other systems. Additionally, the centralized control of back-end intelligence can help the personal assistant server 125 support many different types of applications and functionalities, it can also become somewhat unwieldy and cause delays for processing certain application requests that could be processed more quickly, in some instances, by more specialized systems.

Figure 2A:
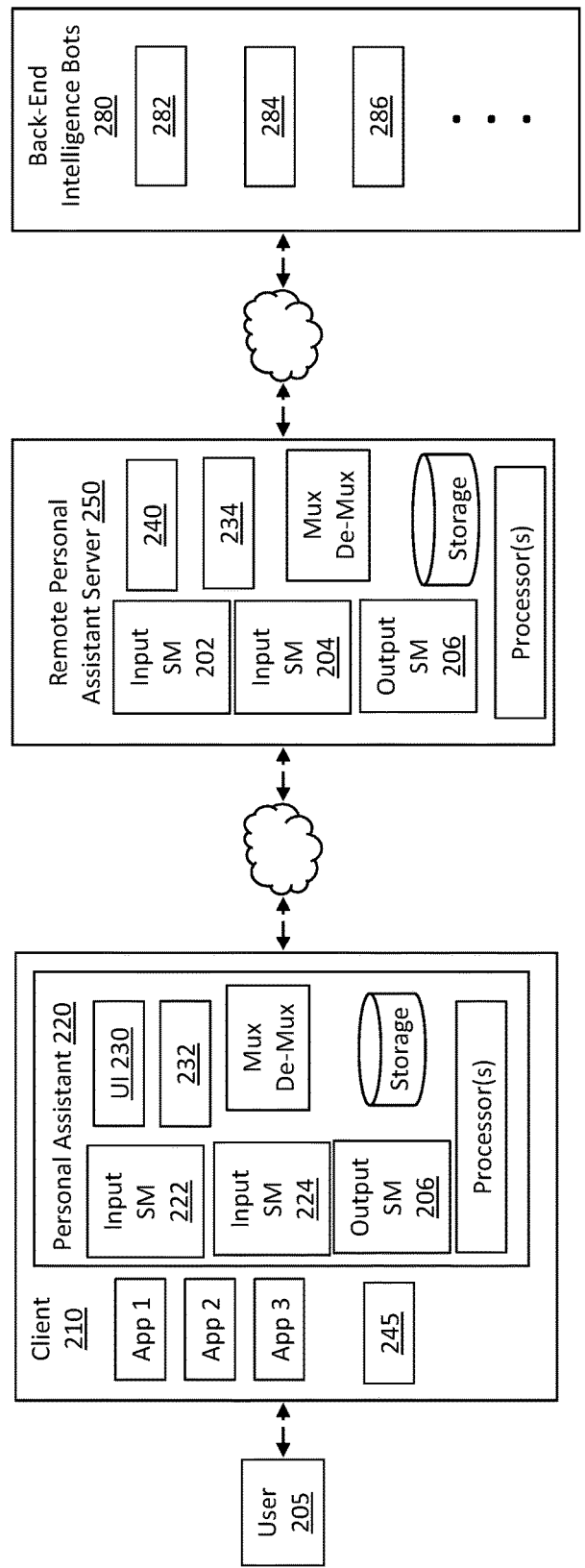
FIG. 2A illustrates an embodiment of a personal assistant system architecture in which a remote personal assistant server/service is configured with a plurality of state machines and is interposed between the front-end personal assistant interface and one or more remote back-end intelligence bots.

FIG. 2A illustrates an embodiment of a personal assistant system architecture 200A in which a remote personal assistant server 250 or service is configured with a plurality of state machines, including at least two different input state machines (e.g., 202 and 204) and at least one output state machine (206) to facilitate asynchronous communications and interfacing with the personal assistant 220 of a client 210. The personal assistant 220 of the client 210 also includes a plurality of state machines, including at least two different input state machines (222, 224) and at least one output state machine 206 to facilitate the asynchronous communications.

The state machines manage the state and the processing flow of the inputs and outputs passing through the personal assistant 220 and remote personal assistant server 250. For instance, input state machine 222 is a dedicated state machine for managing state and processing flow of a first type of input (e.g., speech/audio inputs) which is received from the microphone or other hardware 245 of the client device and that is processed by the speech interface 232 in route to the remote personal assistant server 250.

Likewise, a second input state machine 224 is a dedicated state machine for managing state and processing flow of a second type of input (e.g., data other than speech, such as sensor data) which is received from one or more hardware components 245 (which can include any type of hardware sensor) and which is processed by corresponding interfaces (e.g., 230) in route to the remote personal assistant server 250.

While only two input state machines are shown, there may also be others, dedicated to processing inputs for one or more predetermined types of data. In some instances, however, the management of state and processing flow for all data inputs are managed by the second input state machine 224, other than for speech input, which is managed by the first input state machine 222.

The output state machine 206 is configured to manage state and processing flow of all output received from the remote personal assistant server 250, as managed by the output state machine 206 of the remote personal assistant server 250.

The remote personal assistant server 250 also includes a plurality of state machines, including at least a first input state machine 202, which is a dedicated state machine for managing state and processing flow of a first type of input (e.g., speech/audio inputs), which is received from the speech interface 232, which is further processed and transformed by a speech service/application 234 at the remote personal assistant server 250, and/or further transformed by being augmented with contextual information from other interfaces 240 at the remote personal assistant server 250, prior to be provided to the back-end intelligence bots 280.

Likewise, a second input state machine 204 is a dedicated state machine for managing state and processing flow of a second type of input (e.g., data other than speech, such as sensor data) which is received from the other interfaces (e.g., 230) of the personal assistant and which is processed and used as and/or to obtain contextual information for supplementing information provided to the back-end intelligence bots 280.

Multiplexers and de-multiplexers (Mux/DeMux) at the personal assistant 220 and remote personal assistant server 250 serialize/multiplex and deserialize/demultiplex the outgoing and incoming packets of data, respectively, from the different interfaces, according to the processing flows that are managed by and controlled by the different state machines and enable processing/transmission of different packets according to their specified protocols.

According to some embodiments, the protocols for transmitting the packets, is a standard Transmission Control Protocol (TCP) protocol or a User Datagram Protocol (UDP). Other protocols, such as USP and other protocols can also be used. In some instances, a proprietary protocol that is known to a particular personal assistant and back-end intelligence bot, but which is not known to other personal assistants and back-end intelligence bots is used, or a standard protocol that uses proprietary encryption known only by the particular personal assistant and corresponding intelligence bot, but not other personal assistants or back-end intelligence bots, is used to transmit the packets of data between the systems.

The states of the different input/output packets are maintained and updated by the state machines in one or more data structures (e.g., tables) within corresponding storage of the systems. The states of the different packets and communications, as maintained, will enable or prevent different packets from being transmitted according to the different protocols and communication policies established by and/or used by the interfaces to communicate between the different system components.

It will be appreciated that the use of a plurality of separate and dedicated state machines, with the multiplexers/demultiplexers (e.g., Mux's/DeMux's) enables asynchronous communications/transmissions of packets for data of different types. For instance, this enables asynchronous transmission of speech data along with other data of a different type, such as sensor data that can provide context for the speech data, to be processed and transmitted concurrently/asynchronously with the speech data, and which are all multiplexed together in one or more streams of data packets transmitted between the system components. These streams of data can also be demultiplexed and processed by the different system components/interfaces according to the managed state and processing flow controlled by the different state machines.

The manner in which the state machines and multiplexers/de-multiplexers facilitate the asynchronous communications will be more apparent in the description of FIGS. 3-5, further below.

As also shown in FIG. 2A, the personal assistant 220 also includes a front-end interface 230, which may include user interfaces and communication interfaces for facilitating communications between the user 205 and the client 210 applications with the personal assistant 200 and to additionally facilitate communications between the personal assistant 220 and the remote personal assistant server 250, via corresponding interface(s) 240 at the remote personal assistant server 250. These interfaces may include APIs (application programming interfaces), as well as graphical and audio interfaces.

The personal assistant 220 also includes a speech service/application 232 which is configured to receive and process audio received at the client, via one or more hardware components 245 (e.g., a microphone) and to transmit that audio as speech input to the remote personal assistant server 250. It can also receive speech inputs (comprising output data) from the remote personal assistant and to provide that speech as audio that is rendered by the client as audio via one or more hardware components 245 (e.g., a speaker).

The remote personal assistant server 250 also includes a corresponding speech service/application 234 that is configured to receive the speech input and to convert it into text, which can be provided to one or more back-end intelligence bots 280 (e.g., 282, 284, 286), as well as to convert outputs from the back-end intelligence bots 280 into speech data that is provided as speech input for the personal assistant 220 to render to the user 205.

The back-end intelligence bots 280 are configured as specialized and proprietary back-end intelligence bots for the personal assistant 220 to perform specialized functions with the data they receive and to provide output that can be provided back to the personal assistant 220 at the client.

In some instances, each back-end intelligence bot is developed with the personal assistant it corresponds with, so as to enable it to perform specialized functions associated with the personal assistant. In this manner, the personal assistant 220 and back-end intelligence bot(s) (e.g., 282, 284 and/or 286) corresponding to it can perform functions more quickly and nimbly than conventional personal assistant systems that are configured to address a broader range of functionality (such as functionality enabled by different personal assistants/bots that are proprietary to a different enterprise/entity).

In some instances, the corresponding back-end intelligence bot is unique to only that personal assistant and is not shared with any of the other personal assistants that are connected to the remote personal assistant server 250. In this manner, it is possible to maintain greater control over proprietary and/or confidential information used by the personal assistant and back-end intelligence bot.

In one example, an enterprise, such as a car manufacturer (e.g., BMW), can create their own proprietary personal assistant 220 and corresponding back-end intelligence bot(s) (e.g., 282 and or another bot) to perform a limited set of functions that are specialized and unique to the BMW cars (e.g., navigation to BMW dealerships or mechanics, maintenance routines, etc.), such that a user 205 (e.g., driver) could invoke the personal assistant and services of that assistant while driving, by speaking 'BMW, please tell me when my oil change is due.'

In this example, the BMW personal assistant could convert that audio to speech input that is sent to the remote personal assistant server 250 and converted into text that is sent to the back-end intelligence bot (e.g., 282) for BMW that evaluates requirements for that user's car and the last scheduled maintenance and can provide the correct output answer that is sent back through the remote personal assistant server (converted back to speech data) that is then rendered by the BMW personal assistant as audio for the user, telling the user when the next oil change is due.

To further assist a user, the client device (which may comprise a car in this instance), may also include sensors within the shown client hardware 245 (e.g., oil level sensors, air tire sensors, GPS sensors, temperature sensors, cameras, calendar data and/or any other input component or sensor) to provide additional sensory data to the remote personal assistant that is augmented by the remote personal assistant server 250 to the data it provides to BMW's back-end intelligence bot. In such an example, the BMW's back-end intelligence bot may proactively provide instructions/output that indicates that an oil change or other fluid refill is suggested or due, based on a detected condition or context determined from the information that is obtained from the other sensors/sensor data.

For instance, the instruction may indicate that the tire(s) need to be filled with additional air pressure, due to detected temperature, road conditions, detected pressure levels in the tires, etc. The information provided to the user may also specify a location and navigation prompts for finding BMW mechanic or dealership where to obtain new tires or have maintenance performed, based on the detected contextual information.

Notably, and importantly, this information can also be relayed and provided to the user, proactively, and asynchronously, while the user is engaging in speech dialog with the personal assistant for another issue (e.g., the user has initiated a query and is awaiting a response and/or the user is in the middle of dictating a query, and/or while the user is utilizing the personal assistant to perform functionality with a different application at the client).

In such instances, the asynchronous and proactive information communication can be provided to the user via the personal assistant with one or more interfaces (e.g., visual and/or audio), even if it means that the user's current dialog is interrupted or simultaneously occurring, and even though the user may not have been inquiring for the information provided (e.g., they may have been inquiring about an oil change and received information about tire maintenance and locations for getting service), before, during and/or after the information they inquired about.

It will be appreciated that the functionality of each back-end intelligence bot can be customized for each enterprise and developer to accommodate different needs and preferences for each correspondingly unique/proprietary personal assistant. This functionality also includes prioritization and filtering of data to determine what outputs should be provided to a user, based on the contextual information that is received (e.g., sensor data) in combination with the speech data that is received. In some instances, different terms, tuples, phrases or other inputs comprise key terms or profiles that map to proprietary outputs that are programmed into the different bots by the developers. In some instances, the mappings, are stored in storage at the remote personal assistant server. In other instances, this information is proprietary and confidentially maintained at the back-end intelligence bots without being provided to the remote personal assistant server 250.

In some instances, there is only a single back-end intelligence bot (282, 284 or 286) for each personal assistant 220. In other instances, there are multiple back-end intelligence bots associated with and linked to by the different personal assistant. The remote personal assistant server 250 maintains a mapping of associations between the different personal assistants and back-end intelligence bots to ensure client data is maintained separately and not provide to the wrong entities. These mappings are maintained in the storage. In some instances, the state machines can also be used to help control which packets are transmitted to the different personal assistants and back-end bots based on identifiers that can be attached to the data packets to identify source and destination of the packets.

It is noted that the different systems in the architecture 200A, such as the client 210, personal assistant 220, remote personal assistant server 250 and back-end intelligence bots 280 may each include and/or use one or more processor(s) (those shown and/or other processors that are not shown), which include hardware processors that execute executable instructions to enable interactions between the different illustrated/described components and to facilitate the functionality described herein.

It will also be appreciated that the different systems (e.g., client 210, personal assistant 220, remote personal assistant server 250 and back-end intelligence bots 280) as well as each of the different components may be connected through one or more wired and/or wireless connections. Additionally, while some of the systems are shown as discrete systems that are circumscribed into an illustrated box, it will be appreciated that each of these systems may be a stand-alone system or a distributed system that includes two or more remotely connected computer systems/components. Additional descriptions of the computing environment and types of computing systems that may be used with or incorporated into the described embodiments are provided at the end of this disclosure.

Figure 2B:
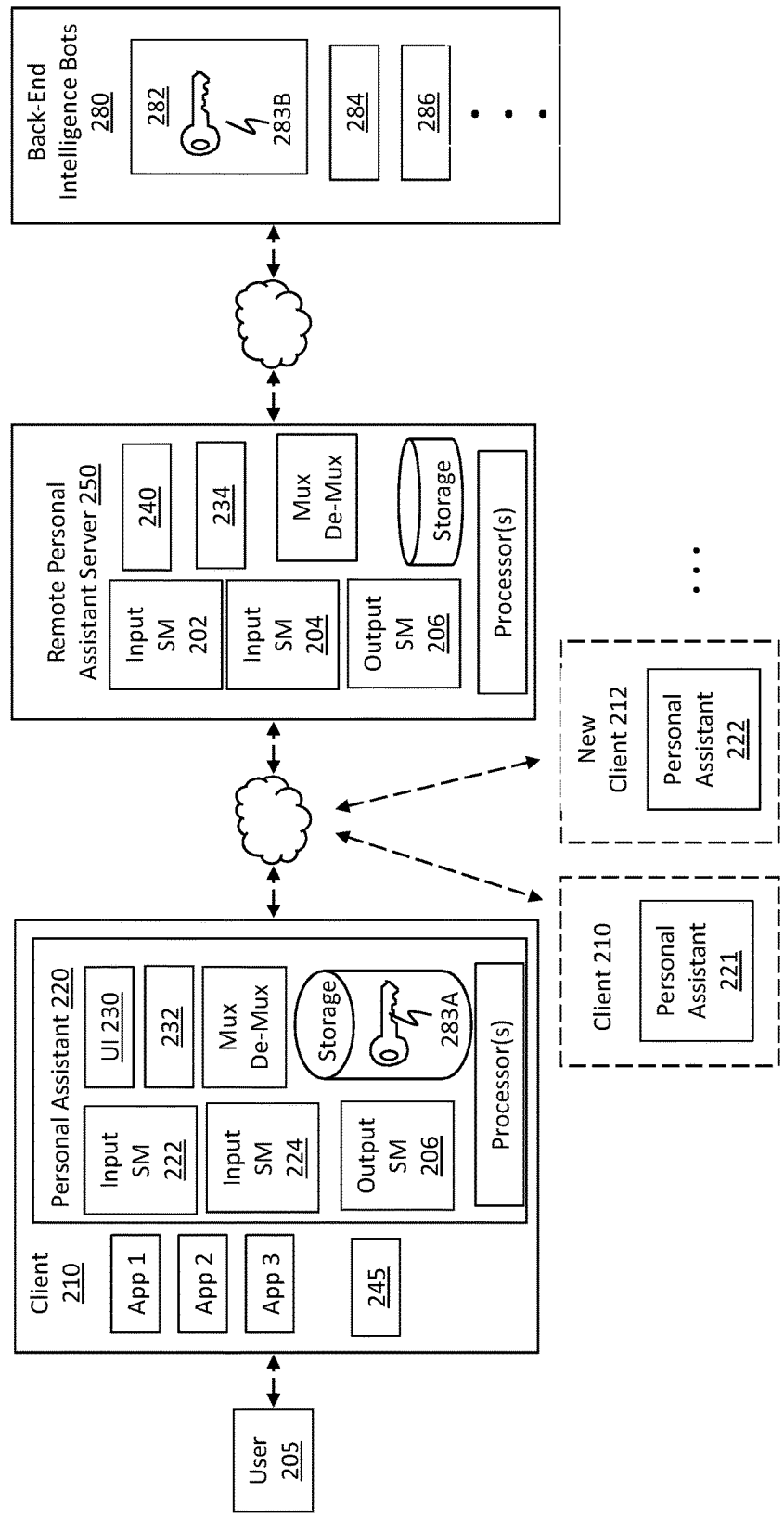
FIG. 2B illustrates an embodiment of a personal assistant system architecture, like the architecture of FIG. 2A, but wherein the remote personal assistant server/service is shown as interfacing with a plurality of different personal assistants and in which security features are implemented to control and add privacy to communications transmitted between the personal assistant front-ends and the back-end intelligence bots through the remote personal assistant server/service.

Attention will now be directed to FIG. 2B, which illustrates an embodiment of a personal assistant system architecture 200B, similar to the architecture of FIG. 2A, but wherein the remote personal assistant server/service is shown as interfacing with a plurality of different personal assistants and in which security features are implemented to control and add privacy to communications transmitted between the personal assistant front-ends and the back-end intelligence bots through the remote personal assistant server/service.

It will be noted that the different personal assistants that can be connected with the remote personal assistant server 250, along with the aforementioned personal assistant 220, can include any combination of similar, identical, different, proprietary, unique personal assistants, each of which may be connected, via the remote personal assistant server 250, to any combination of one or more similar, identical, different, proprietary or unique back-end intelligence bots 280 than the one or more bot(s) used by other personal assistant(s).

In some instances, a same client (e.g., client 210) utilize a plurality of different personal assistants (e.g., personal assistant 220 and 221, each of which is configured with similar components as previously shown and described with reference to FIG. 2A, but which is connected to different back-end intelligence bots 280 and or that interface with different client applications, for enabling different/unique functionality and user experiences). In yet other instances, different clients (e.g., client 210 and client 212) have different proprietary personal assistants and may have different applications and link to different back-end bots to provide entirely different functionality and user experiences. For instance, by way of example, client 212 may be a school learning device and the personal assistant 222 may be designed to interface with a back-end intelligence bot (e.g., 286) for performing a school exam, or another type of client and bot combination for providing yet different functionality which is entirely different than the client device and functionality provided by client 210 and personal assistant 220.

In other instances, not shown, different clients (e.g., client 210 and another client on a different device) share a common or similar personal assistant (e.g., personal assistant 220), to provide similar functionality to a classified type of user, such as all employees of an enterprise that all utilize a same or similar type of client device having similar applications.

In some instances, the plurality of state machines (e.g., at least two input state machines and at least one output state machine) provided by the personal assistant are shared between different personal assistants on a same client, or when provided as a service, for the same personal assistant service. In other instances, a separate set of the plurality of state machines is instantiated/provided for each instance of the personal assistant that is used.

The remote personal assistant server 250 may also provide/instantiate provide a separate set of the plurality of state machines shown, for each personal assistant it interfaces with and/or each personal assistant session with a client that it participates. Alternatively, or additionally, it may share a set of the state machines with different clients, personal assistants, personal assistant instances and/or personal assistant communication sessions.

The foregoing examples, are merely illustrative of the flexible scope and utility of the configuration described above, for separating the back-end intelligence bots away from the remote personal assistant server, to facilitate the deployment and use of customized and proprietary personal assistants and for using a plurality of different/dedicated state machines for facilitating the asynchronous personal assistant services, including speech services with contextual information.

FIG. 3 illustrates a processing flow diagram 300 that reflects the flows of two different processes that are performed asynchronously, by implementing aspects of the systems/methods disclosed herein.

As shown, data is received and processed by one or more of the processing systems that have described above (e.g., the personal assistant, personal assistant server, and intelligence bot(s)). These processing systems are collectively illustrated as block 350, for convenience.

As also shown, these systems 350 enable asynchronous communications to occur, such that speech data can be received and can start to be processed while other data is also received, such as UI input data (e.g., input entered at a touch screen or other device or data detected by a sensor). This additional data 310 can be received and can be processed asynchronously with the speech data, without causing an error, because of the use of different state machines, including at least one dedicated to the speech data 305. Then, the response to the speech data can be provided with the UI output data, asynchronously.

In one non-limiting example of the foregoing processing flow, a user can tell their personal assistant to enlarge a selected item on a map. The user can simultaneously or subsequently select the item/area on the map showing on a touch screen. The personal assistant systems will process this data (with the instruction being processed/transformed at the personal assistant server into an instruction that is translated and interpretable at the appropriate intelligence bot, augmenting the instruction with context of the portion of the map that has been selected) and which causes the back end bot to identify whether the instruction is appropriate and, if so, to identify a map database to obtain an enlarged map of the selected item/area, and to provide this as output that is processed and passed back to the user as the enlarged map (e.g., UI output data 325) and a confirmation as response data 320 confirming the action (e.g., speech that rendered to the user, such as 'here you go'). Notably, such functionality is not previously possible with conventional personal assistants that operate with a single state machine and that are not capable of processing the other input data 310 asynchronously, and which must wait to receive/process the other data 310 until after the managed state for the first speech session is reflected as processed and completed.

FIG. 4 illustrates another processing flow diagram that reflects a plurality of different processes that are performed asynchronously, by implementing aspects of the systems/methods disclosed herein, and which can facilitate asynchronous speech services based on or with contextual information.

In this flow 400, the system 450 processes inputs and outputs, such as sensor data 405 and 415, which may be received from any number of sensors and hardware components (e.g., GPS devices, gyroscopes, pressure gauges, cameras, microphones, timers, counters, weather and temperature sensors, and other sensors). Accordingly, this sensor data, for example, may include GPS data, temperature data, pressure data, velocity data, light data, camera data, timing data, and other data.

As shown, the speech data 410 is reflected as a partially filled box. This is to indicate a scenario in which a user starts to speak a command (e.g., 'Assistant, please tell me . . . . '), but does not yet finish the command before it starts to be processed by the system in such a manner as to generate a response. In this instance, for example, the processing can include transforming the speech to text and augmenting the data with historical or contextually relevant data accessible to the system, such as a current event data, a calendar event data, a historical pattern, positioning data, or any other contextual information. The system components (as previously described) can then generate a response based on the input that has been processed up to that point, along with the contextual information that is has received (e.g., data 405 that may include current positioning information and/or time information and/or weather/temperature information).

In this example, the system may preempt the user's remaining speech by providing a response that is an inferred response 425, such as 'the temperature is 70 degrees', or 'the outcome of the vote is 55 to 45 in favor of the bill', or 'turn left at the next street', or 'you have 5 more miles to go', etc. These inferred responses may be based on processing any combination of the data 405, the speech data 410 and/or other contextual information the system is able to access with the personal assistant server and/or corresponding intelligence bot(s), as previously described.

Importantly, it is noted that the inferred response is received asynchronously from the speech input processing, and this is enabled by the configurations of the system 450, as previously discussed, with separate state machines to manage the flow of the speech input separately from the state of the output and other inputs.

The flow 400 also shows how the system may provide a different or full response 430, based on additional information (e.g., data 415) which is processed and used to generate the full/different response 430, but which may not have been considered prior to the generation of the inferred response 425. For instance, if the temperature changes, as detected by data 415, the system may send a corrected/updated temperate as the full/different response 430. In this instance, the inferred response 425 was queued up for sending to the user independently of knowing that the new data 415 had been received. Accordingly, because the states are managed separately, with different state machines, this new data could be received and could start to be processed concurrently with the inferred response being finalized and transmitted to the user. Likewise, the sending of the inferred response could now be used as contextual information for the system to know that a new full/different response 430 should be generated and sent to the user in response to the additional data 415 that is received. Again, this can be performed asynchronously.

Figure 5:
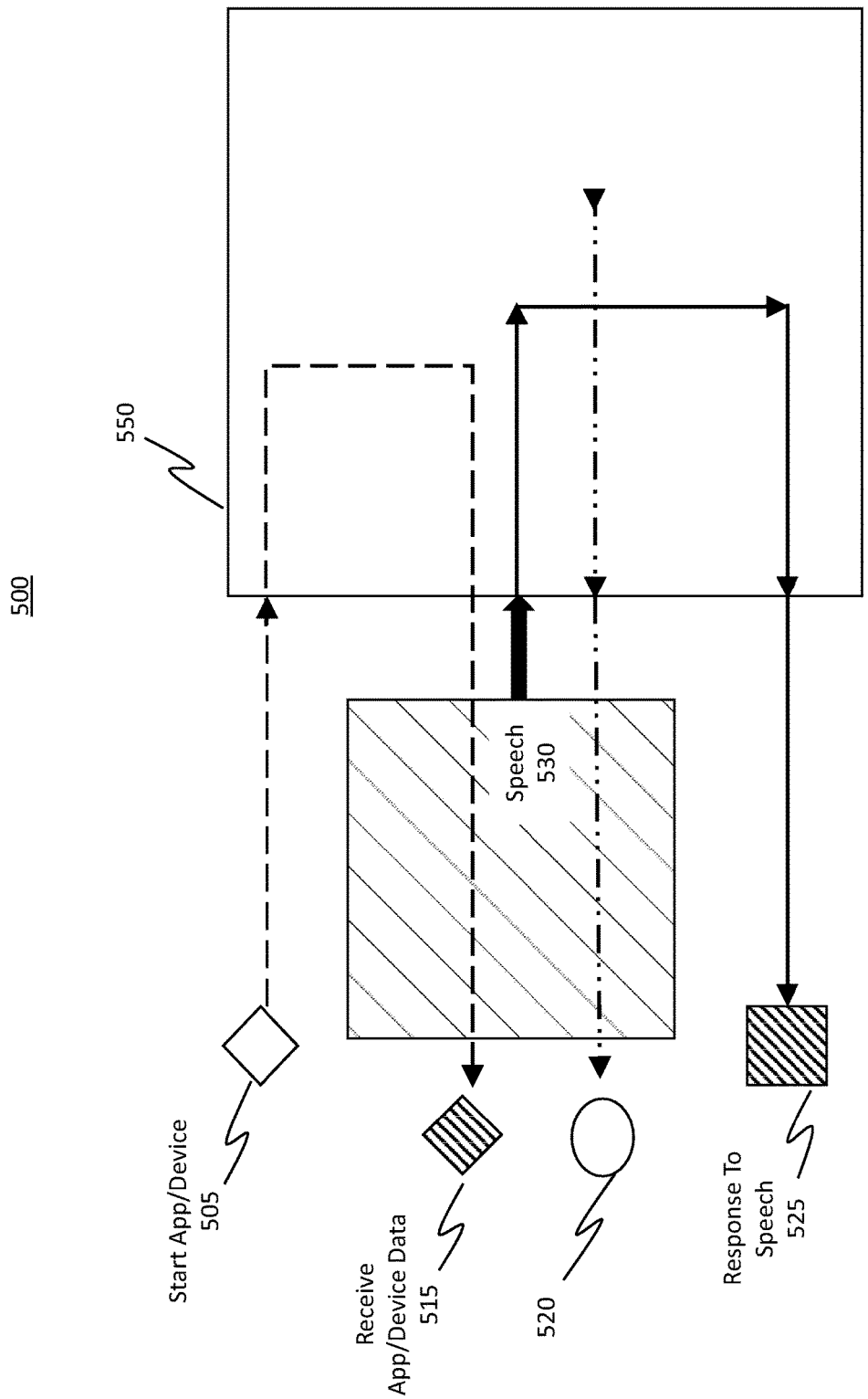
FIG. 5 illustrates another processing flow diagram that reflects a plurality of different processes that are performed asynchronously, by implementing aspects of the systems/methods disclosed herein.

FIG. 5 illustrates another processing flow diagram that reflects a plurality of different processes that are performed asynchronously, as enabled by implementing aspects of the systems/methods disclosed herein.

As shown, an application or device is started, which is connected to the personal assistant, as reflected by the start App/Device input 505. This triggers a process of instantiating one or more applications/drivers/interfaces. This processing flow for launching the application/device is managed through a first set of one or more state machines of the system 550 and which may include accessing/relying on output provided by the intelligence bots and which may be further based on contextual information provided to the bots by the personal assistant server when it processes and transforms (e.g., translates, augments) the input/information provided to the intelligence bots. In some instances, the App/Device input 505 is simply a request to start an application or to enable/connect a device. Based on the output from the intelligence bot(s) associated with the personal assistant, a corresponding response or instruction will be received. This response may include App/Device Data 515.

Notably, and asynchronously, prior to the App/Device data 515 being received (which may be, for example, an instruction for enabling the application/device to launch and/or a confirmation that it has launched and that may be rendered as audio or visual data), the system 550 receives a stream of speech data 530. In one instance, the start App/Device input 505 is entered as touch input at a touch screen device of the client device by a user and which is sufficient to trigger the launching of an email application and interface display at the touch screen. In this example, the speech data is a request spoken by the user and detected by a microphone of the client device, for the personal assistant system to send an email to a target entity.

Then, while the speech data 530 is being received, the application is launched and this results in the system confirming that the email has been sent (e.g., response to speech 525). The processing of sending the email may include transforming the speech to a translated instruction for the intelligence bot and then obtaining output from the bot that the email was sent. The email may be sent using contact information and/or communication protocols available to and known by the personal assistant and/or corresponding intelligence bot, which are proprietary and not known to the personal assistant server or other personal assistants. For instance, the personal assistant may encrypt contact information obtained from an application/storage on the client's device using a key (e.g., 283A) and that information can be transmitted securely to the intelligence bot 282 for decryption using a corresponding key 283B prior to performing its other functions.

The flow 500 of FIG. 5 illustrates how additional information (e.g., a start App/Device request) can be received and processed, as an independent request, asynchronously, from speech data 530 that is received and processed and how this provides enhanced functionality and utility for personal assistants that was not possible with conventional systems.

In some instances, some additional information 520 can include a proactive and unrequested notification by the system which may be related to the speech input 530 and which is triggered by the system when it determines (based on the speech 530, start app/device 505 input, other sensor input and/or other contextual information) that the notification should be provided. In one instance, for example, the other data 520 comprises a notification that the recipient has acknowledged receipt of the message or forwarded, replied to, or deleted the message. In other instances, the additional information 520 can also be completely unrelated to the speech data 530 that is being received, such as a notification of what time it is or what the temperature is or how fast the user is moving, etc.

Importantly to note, however, is that the system does not have to wait for the stream of speech data 530 to be processed and in a completed state before the other data 520 is provided through the same personal assistant that is processing the speech input. This is because of the use of different state machines by the same personal assistant and the other configurations described herein. Instead, the other data 520 can be received asynchronously from the speech data 530, even interrupting (speaking to the user as rendered through a speaker and as managed as output data with the output state machines), while the user is simultaneously speaking (as detected by the microphone and as managed as input data with the input state machines).

Figure 6:
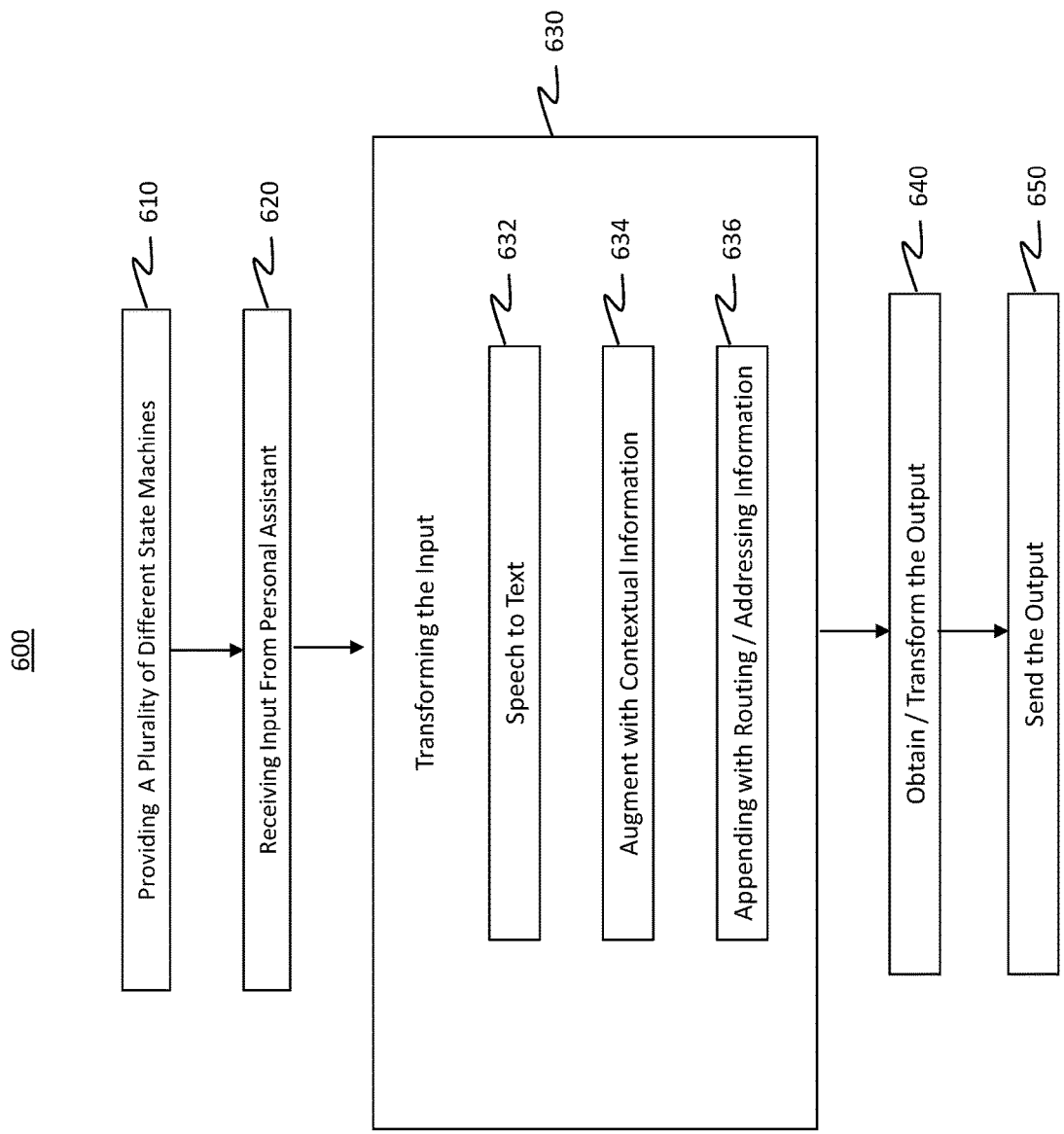
FIG. 6 illustrates a flow diagram with a plurality of acts associated with methods, disclosed herein, from the perspective of a remote personal assistant service/server, for facilitating and supporting customized personal assistant services and, in some instances, to provide and/or support asynchronous speech services that can be used with personal assistants.

The following discussion for FIG. 6 now refers to a number of methods and method acts that may be performed by a personal assistant system or server, such as described in reference to FIGS. 2A and 2B. Although the method acts may be discussed in a certain order or illustrated in a flow chart as occurring in a particular order, no particular ordering is required unless specifically stated, or required because an act is dependent on another act being completed prior to the act being performed.

Further, the methods may be practiced by a computer system including one or more processors and computer-readable media such as computer memory which store computer-executable instructions that when executed by one or more processors enable or cause various functions to be performed, such as the acts recited in the disclosed embodiments.

The flowchart 600 in FIG. 6 includes a plurality of acts that are implemented by a personal assistant system or server for facilitating and supporting customized personal assistant services and to at least support asynchronous speech services for one or more remotely connected personal assistants.

These acts, include an act of providing a plurality of different state machines (act 610). As noted previously, the plurality of different state machines include at least at least a first input state machine, which is dedicated to managing a state and a processing flow of a first type of input (e.g., speech input) which is received from a speech interface for the one or more remotely connected personal assistants, as well as at least a second input state machine dedicated to managing a state and a processing flow of a second type of input (e.g., other than speech input) which is received from one or more interfaces other than the speech interface of the one or more remotely connected personal assistants, and at least one dedicated output state machine, which is dedicated to managing a state and a processing flow of output provided to the one or more remotely connected personal assistants in response to at least the first and second type of input.

Next, the system receives first input from a client through a first personal assistant (act 620). The first input comprises a first type of input (e.g., speech input) and the first input state machine controls the state and processing flow of the first input through the personal assistant server. Notably, this input is received asynchronously from other input of other types (e.g., other than speech) that is received by the system through the first personal assistant and/or from output that is provided to the client through the personal assistant.

Next, the system transforms the first input (act 630), such as by translating or converting the first input into a different format, such as speech to text, or another format change. This transformation may also include adding contextual information and/or appending the input with routing/addressing information for routing the input to a particular back-end intelligence bot.

The system then sends the input, once transformed, to the appropriate and corresponding intelligence bot that the personal assistant is mapped to. In some instance, this may include sending the input to only a single intelligence bot or, alternatively, to a plurality of different intelligence bots. In some instances, the intelligence bot is proprietary to the personal assistant and they communicate with encrypted security keys known only to the personal assistant and the corresponding intelligence bot(s). In other instances, the intelligence bot(s) comprise an existing personal assistant platform, such as a conventional Microsoft, Apple, Google, Amazon, Samsung or other personal assistant platform.

Next, the system obtains output to send to the first personal assistant which is associated with the first input (act 640). In some instances, this act includes performing additional transformations, similar to those that were described above, for changing the format (but text to speech this time), augmenting the output and/or appending with routing information.

The system also uses the different state machines to manage and update the states of the different input/output communication sessions, as described before, with the different state machines.

Then, the system sends the first output to the first personal assistant (act 650), wherein the first input state machine controls the state and processing flow of the first output from the personal assistant server to the first personal assistant without restricting the processing flow of the first output based on the state of the first input at the first input state machine. The transmission of the inputs and outputs may also include multiplexing and demultiplexing the input/output packets contained in the communication streams transmitted between the different systems/components, as previously described.

In some instances, the system, prior to sending the output, receives second input from the personal assistant which is of a second input type (other than speech input). The system may obtain the second output corresponding to the second input prior to sending corresponding second output (responsive to the second input) to the personal assistant, such that control and management of state and processing flow of the first output and the second output are asynchronous from the control over the state and processing flow of the first and second input state machines.

In some instances, the first input is only a portion of a set of first inputs that are received by the personal assistant server as a continuous string of speech received from the first personal assistant, and wherein the acts of transforming and obtaining are performed prior to receiving an entirety of the set of first inputs.

In some instances, the sending of the first output to the first personal assistant is further performed prior to the receiving the entirety of the set of first inputs.

In some instances, the transforming comprises converting the speech to text and providing a query to a remote back-end intelligence bot based on the text. This query may include context information (such as received as part of the second input or prior input) that augments the text.

In some instances, the query or transformed input provided to the intelligence bot(s) includes a security token received from the personal assistant and/or is encrypted with a key and which is usable by the back-end bot to validate the first personal assistant and/or to decrypt information received in the query/input prior to the output being generated by the intelligence bot(s) and prior to the output being transmitted to and/or received by the personal assistant server.

In some instances, the personal assistant is a proprietary personal assistant installed on a vehicle for interfacing with a user via hardware in the vehicle (e.g., microphone, speaker, touch/display screen) and wherein the back-end intelligence bot is maintained separately from the remote assistant server.

In some instances, the back-end intelligence bot comprises a separate personal assistant, including at least one of Siri™, Alexa™, Bixby™, Cortana™, or Google Personal Assistant.

As should be appreciated from the foregoing, the configuration and functionality of the disclosed personal assistant server and described methods can help facilitate asynchronous communications through the personal assistants that interface with the personal assistant server and the deployment and use of proprietary personal assistants that can be, in some instances, more secure and more nimble than conventional personal assistants.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RANI and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A personal assistant server for facilitating and supporting customized personal assistant services and to at least support asynchronous speech services for one or more remotely connected personal assistants, the personal assistant server comprising:
   one or more processors;
   a first input state machine which manages state and processing flow of a first type of input which is received from a speech interface for the one or more remotely connected personal assistants, including at least a first personal assistant;
   a second input state machine which manages state and processing flow of a second type of input which is received from one or more interfaces other than the speech interface of the one or more remotely connected personal assistants;
   at least one output state machine which manages state and processing flow of output provided to the one or more remotely connected personal assistants in response to at least the first and second type of input;
   one or more computer-readable media having stored thereon instructions that are executable by the one or more processors to cause the personal assistant server to implement a method for supporting asynchronous speech services, the method comprising:
      providing a plurality of different state machines, the plurality of different state machines including the first and second input state machines and the at least one output state machine;
      receiving first input from the first personal assistant comprising the first type of input, wherein the first input state machine controls the state and processing flow of the first input at the personal assistant server;
      transforming the first input;
      obtaining first output to send to the first personal assistant which is associated with the first input; and
      sending the first output to the first personal assistant, wherein the first input state machine controls the state and processing flow of the first output from the personal assistant server to the first personal assistant asynchronously from the processing flow of the first input controlled by the first state machine.

2. The personal assistant server of claim 1, wherein prior to sending the output, the method further includes:
   receiving second input from the personal assistant which is of the second input type;
   obtaining second output corresponding to the second input prior to sending the second output to the personal assistant; and
controlling and managing state and flow of the first output and the second output asynchronously from the control over the state and processing flow of the first and second input state machines.

3. The personal assistant server of claim 2, wherein the first input is only a portion of a set of first inputs that are received by the personal assistant server as a continuous string of speech received from the first personal assistant, and wherein the acts of transforming and obtaining are performed prior to receiving an entirety of the set of first inputs.

4. The personal assistant server of claim 3, wherein the sending the first output to the first personal assistant is further performed prior to the receiving the entirety of the set of first inputs.

5. The personal assistant server of claim 1, wherein transforming comprises converting the speech to text and providing a query to a remote back-end intelligence bot based on the text.

6. The personal assistant server of claim 5, wherein the query includes context information that augments the text.

7. The personal assistant server of claim 6, wherein the context information is at least partially based on the second input.

8. The personal assistant server of claim 7, wherein the obtaining includes obtaining the output which is provided from the back-end intelligence bot.

9. The personal assistant server of claim 8, wherein the query includes a security token received from the personal assistant and which is usable by the back-end bot to validate the first personal assistant prior to the output being received by the personal assistant server.

10. A method implemented by a personal assistant server for facilitating and supporting customized personal assistant services and to at least support asynchronous speech services for one or more remotely connected personal assistants, the method comprising:
    providing a plurality of different state machines, the plurality of different state machines including:
        at least at least a first input state machine, which is dedicated to managing a state and a processing flow of a first type of input which is received from a speech interface for the one or more remotely connected personal assistants;
        at least a second input state machine dedicated to managing a state and a processing flow of a second type of input which is received from one or more interfaces other than the speech interface of the one or more remotely connected personal assistants; and
        at least one dedicated output state machine, which is dedicated to managing a state and a processing flow of output provided to the one or more remotely connected personal assistants in response to at least the first and second type of input;
    receiving first input from a first personal assistant comprising the first type of input, wherein the first input state machine controls the state and processing flow of the first input at the personal assistant server;
    transforming the first input;
    obtaining first output to send to the first personal assistant which is associated with the first input; and
    sending the first output to the first personal assistant, wherein the first input state machine controls the state and processing flow of the first output from the personal assistant server to the first personal assistant without restricting the processing flow of the first output based on the state of the first input at the first input state machine.

11. The method of claim 10, wherein prior to sending the output, the method further includes:
    receiving second input from the personal assistant which is of the second input type;
    obtaining second output corresponding to the second input prior to sending the second output to the personal assistant; and
controlling and managing state and flow of the first output and the second output asynchronously from the control over the state and processing flow of the first and second input state machines.

12. The method of claim 11, wherein the first input is only a portion of a set of first inputs that are received by the personal assistant server as a continuous string of speech received from the first personal assistant, and wherein the acts of transforming and obtaining are performed prior to receiving an entirety of the set of first inputs.

13. The method of claim 12, wherein the sending the first output to the first personal assistant is further performed prior to the receiving the entirety of the set of first inputs.

14. The method of claim 10, wherein the transforming comprises converting the speech to text and providing a query to a remote back-end intelligence bot based on the text.

15. The method of claim 14, wherein the query includes context information that augments the text.

16. The method of claim 15, wherein the context information is at least partially based on the second input.

17. The method of claim 16, wherein the obtaining includes obtaining the output which is provided from the back-end intelligence bot.

18. The method of claim 17, wherein the query includes a security token received from the personal assistant and which is usable by the back-end bot to validate the first personal assistant prior to the output being received by the personal assistant server.

19. The method of claim 10, wherein the first personal assistant is a proprietary personal assistant installed on a vehicle for interfacing with a user in the vehicle and wherein the back-end intelligence bot is maintained separately from the remote assistant server.

20. The method of claim 10, wherein the back-end intelligence bot comprises a separate personal assistant, including at least one of Siri™, Alexa™, Bixby™ Cortana™, or Google Personal Assistant.

* * * * *